US011164595B2

(12) United States Patent
Furukawa et al.

(10) Patent No.: US 11,164,595 B2
(45) Date of Patent: Nov. 2, 2021

(54) DISPLAYED ANALYTICS FOR MULTIPARTY COMMUNICATIONS

(71) Applicant: INTERNATIONAL BUSINESS MACHINES CORPORATION, Armonk, NY (US)

(72) Inventors: Sayaka Furukawa, Tokyo (JP); Hirokazu Yasumuro, Kanagawa (JP); Tomokazu Nakamura, Tokyo (JP); Yukiko Whalen, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 16/210,535

(22) Filed: Dec. 5, 2018

(65) Prior Publication Data
US 2020/0184990 A1   Jun. 11, 2020

(51) Int. Cl.
*G10L 21/10* (2013.01)
*G10L 15/06* (2013.01)
(Continued)

(52) U.S. Cl.
CPC .............. *G10L 21/10* (2013.01); *G10L 15/06* (2013.01); *G10L 15/18* (2013.01); *G10L 15/26* (2013.01)

(58) Field of Classification Search
USPC ......................... 704/231, 246, 247, 251, 252
See application file for complete search history.

(56) References Cited

U.S. PATENT DOCUMENTS

| 2007/0003913 A1* | 1/2007 | Rosenberg ............. G09B 19/06 434/156 |
| 2012/0030244 A1 | 2/2012 | John et al. |

(Continued)

FOREIGN PATENT DOCUMENTS

| GB | 2482415 A | 2/2012 |
| WO | 2016126768 A3 | 10/2016 |

OTHER PUBLICATIONS

Somlertlamvanich, "Social Media Understanding by Word Cloud Timeline", 28th Pacific Asia Conference on Language, Information and Computation, 2014, 3 pages.

(Continued)

*Primary Examiner* — Leonard Saint Cyr
(74) *Attorney, Agent, or Firm* — Nicholas Bowman; Andrew D. Wright; Roberts Calderon Safran & Cole, P.C.

(57) ABSTRACT

A computer device obtains a plurality of terms uttered during a recorded communication between a plurality of parties, identifying information for one or more of the plurality of parties, and an identification of which recorded terms were uttered by each of the one or more parties. The computer device transmits data identifying one or more of the recorded terms, the one or more recorded terms uttered by each party of the one or more parties to be displayed as associated with the party, and the recorded terms being selectable. In response to one of the recorded terms being selected, the computer device transmits data identifying one or more representative utterance times that the selected term was uttered by at least one of the one or more parties, the selected term to be displayed as associated with the one or more representative utterance times along a time axis.

25 Claims, 12 Drawing Sheets

(51) Int. Cl.
*G10L 15/18* (2013.01)
*G10L 15/26* (2006.01)

(56) References Cited

U.S. PATENT DOCUMENTS

| | | |
|---|---|---|
| 2012/0323575 A1 | 12/2012 | Gibbon et al. |
| 2014/0350930 A1 | 11/2014 | Cox et al. |
| 2015/0221344 A1* | 8/2015 | Asano ............... H04N 21/4508 |
| | | 386/241 |
| 2017/0316087 A1 | 11/2017 | Breedvelt-Schouten et al. |
| 2018/0032305 A1* | 2/2018 | Cameron ............... G10L 25/63 |
| 2018/0053510 A1* | 2/2018 | Kofman ............... G10L 15/265 |
| 2018/0190266 A1 | 7/2018 | Sun et al. |

OTHER PUBLICATIONS

Unknown, "ASKA3D", https://aska3d.com/en/technology.php, Accessed Jul. 25, 2018, 8 pages.

Unknown, "Microsoft HoloLens", Microsoft, https://www.microsoft.com/ja-jp/hololens, Accessed Nov. 19, 2018, 5 pages.

Unknown, "IBM Watson Explorer", IBM, https://www.ibm.com/analytics/jp/ja/technology/watson/explorer.html, Accessed Nov. 19, 2018, 9 pages.

Unknown, "Unleash Business Innovation with Holographic Technology", Microsoft, https://www.microsoft.com/en-us/hololens/commercial-overview, Accessed Jul. 25, 2018, 7 pages.

Mell et al., "The NIST Definition of Cloud Computing", NIST, Special Publication 800-145, Sep. 2011, 7 pages.

\* cited by examiner

Time

DISPLAYED ANALYTICS FOR MULTIPARTY COMMUNICATIONS

BACKGROUND

Embodiments of the present invention relate generally to recalling relevant portions of a recorded multiparty communication and, more particularly, to using a 3D word cloud to recall the relevant portions of the recorded multiparty communication.

During the course of a recorded multiparty communication such as, for example, a remote teleconference between multiple parties, one of the parties may occasionally miss relevant portions of the teleconference by either being late or absent from the teleconference. Accordingly, if the missing party desires to capture relevant parts of the teleconference without knowing where the relevant parts are located in the recording when no readable transcript of the conversation is available, the party may have to review the entire recording of the conversation as the only recourse. Such review is typically tedious and time consuming.

SUMMARY

In an aspect of embodiments of the invention, there is a computer-implemented method that includes: obtaining, by a computer device, a plurality of terms uttered during a recorded communication between a plurality of parties, identifying information for one or more of the plurality of parties, and an identification of which recorded terms were uttered by each of the one or more parties; transmitting, by the computer device, data identifying one or more of the recorded terms, the one or more recorded terms uttered by each party of the one or more parties to be displayed as associated with the party, and the recorded terms being selectable; and, in response to one of the recorded terms being selected, transmitting, by the computer device, data identifying one or more representative utterance times that the selected term was uttered by at least one of the one or more parties, the selected term to be displayed as associated with the one or more representative utterance times along a time axis. The method also includes, in response to the one of the recorded terms being selected, replaying the communication from a time that is correlated to at least one of the one or more representative utterance times of the selected term. Implementations of embodiments of the invention thus advantageously provide the ability to recall and replay targeted contents of a recorded multiparty communication such as a teleconference during or after the conclusion of a teleconference.

In another aspect of embodiments of the invention, there is a computer program product including a computer readable storage medium having program instructions embodied therewith. The program instructions are executable by a computing device to cause the computing device to: obtain a plurality of terms uttered during a recorded communication between a plurality of parties, identifying information for one or more of the plurality of parties, and an identification of which recorded terms were uttered by each of the one or more parties; transmit data identifying one or more of the recorded terms, the one or more recorded terms uttered by each party of the one or more parties to be displayed as associated with the party, and the recorded terms being selectable; and, in response to one of the recorded terms being selected, transmit data identifying one or more representative utterance times that the selected term was uttered by at least one of the one or more parties, the selected term to be displayed as associated with the one or more representative utterance times along a time axis. Implementations of embodiments of the invention thus advantageously provide the ability to recall and replay targeted contents of a recorded multiparty communication such as a teleconference during or after the conclusion of a teleconference.

In another aspect of embodiments of the invention, there is system including a processor, a computer readable memory, and a computer readable storage medium. The system includes: program instructions to obtain a plurality of terms uttered during a recorded communication between a plurality of parties, identifying information for one or more of the plurality of parties, and an identification of which recorded terms were uttered by each of the one or more parties; program instructions to transmit data identifying one or more of the recorded terms, the one or more recorded terms uttered by each party of the one or more parties to be displayed as associated with the party, and the recorded terms being selectable; and program instructions to, in response to one of the recorded terms being selected, transmit data identifying one or more representative utterance times that the selected term was uttered by at least one of the one or more parties, the selected term to be displayed as associated with the one or more representative utterance times along a time axis. The program instructions are stored on the computer readable storage medium for execution by the processor via the computer readable memory.

Implementations of embodiments of the invention thus advantageously provide the ability to recall and replay targeted contents of a recorded multiparty communication such as a teleconference during or after the conclusion of a teleconference.

In another aspect of embodiments of the invention, there is a computer-implemented method that includes: transmitting, by a computer device, one or more terms uttered by each of a plurality of parties to a recorded communication to be displayed; receiving, by the computer device, a selection of one of the displayed terms; in response to the selection, transmitting, by the computer device, one or more selectable time references to be displayed, the one or more selectable time references corresponding to instances at which the selected term was uttered during the recorded communication; and in response to one of the selectable time references being selected, transmitting, by the computer device, the recorded communication to be replayed from a time that is correlated to the selected time reference. The computer-implemented method also includes transmitting, by the computer device, one or more of the parties that uttered the selected term to be displayed adjacent to the selected time reference. Implementations of embodiments of the invention thus advantageously provide the ability to recall and replay targeted contents of a recorded multiparty communication such as a teleconference during or after the conclusion of a teleconference.

In another aspect of embodiments of the invention, there is a system that includes: a processor, a computer readable memory, and a computer readable storage medium; program instructions to transmit one or more terms uttered by each of a plurality of parties to a recorded communication to be displayed; program instructions to receive a selection of one of the displayed terms; program instructions to, in response to the selection, transmit one or more selectable time references to be displayed, the one or more selectable time references corresponding to instances at which the selected term was uttered during the recorded communication; and program instructions to, in response to one of the selectable time references being selected, transmit the recorded communication to be replayed from a time that is correlated to the selected time reference. The system also includes program instructions to transmit one or more of the parties that uttered the selected term to be displayed adjacent to the selected time reference. Implementations of embodiments of the invention thus advantageously provide the ability to recall and replay targeted contents of a recorded multiparty communication such as a teleconference during or after the conclusion of a teleconference.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
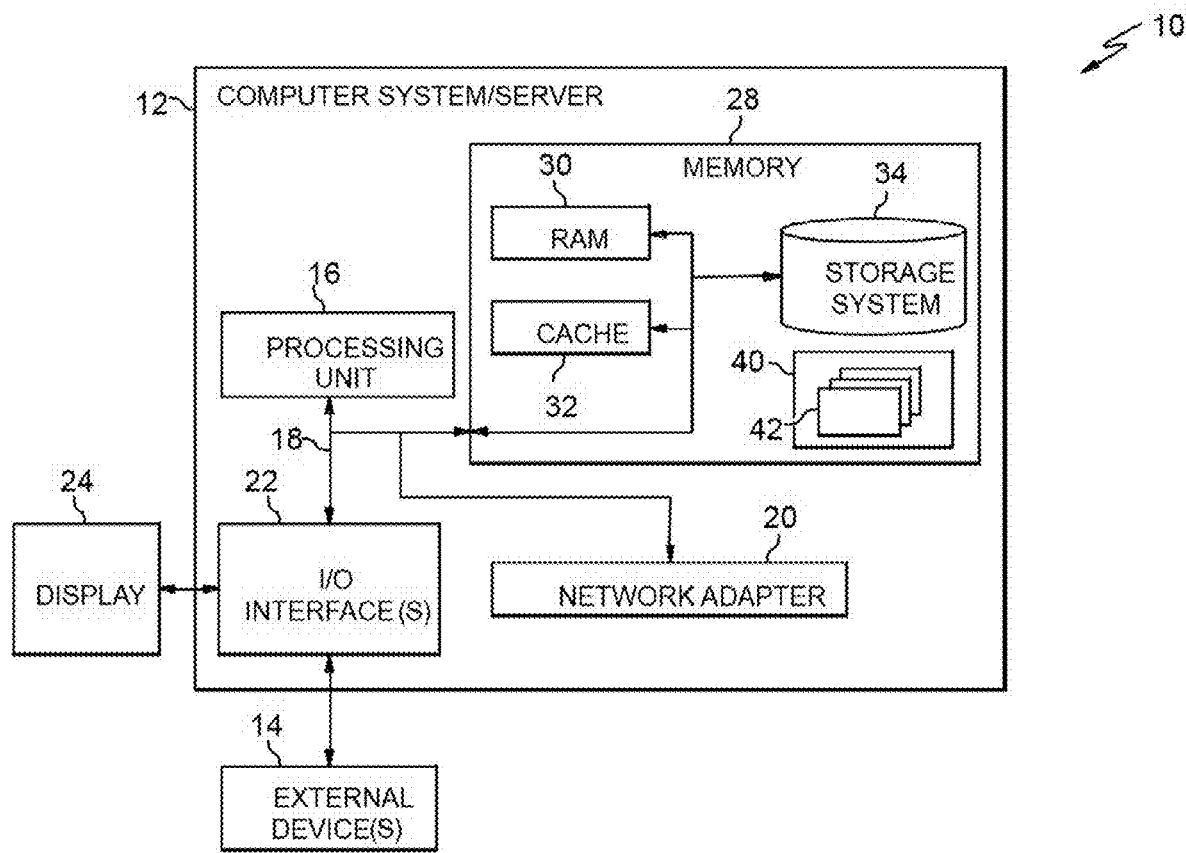
FIG. 1 depicts a cloud computing node according to an embodiment of the present invention.

In embodiments, the present invention relates generally to recalling relevant portions of a recorded multiparty communication and, more particularly, to using a 3D word cloud to recall the relevant portions of the recorded multiparty communication. Implementations of embodiments of the invention allow a party to a multiparty communication such as a teleconference to recall relevant portions of the teleconference even when the party missed a portion or all of the teleconference. In embodiments, the parties to the teleconference are displayed on an interactive 3D word cloud representation, and an identifying characteristic of each of the parties is displayed next to terms that have been uttered by that party. The terms are displayed in a region surrounding each uttering party, and are displayed in a size that is representative of the frequency at which the term was uttered during the teleconference. Each term is also displayed in a color that represents each uttering party. For example, if "Paul" uttered that terms "Database" and "Analytics" a number of times, then the 3D word cloud interactive display will display an identifying characteristic of "Paul" such as, for example, a photograph, and the terms "Database" and "Analytics" next to the photograph. Accordingly, the 3D word cloud display provides a clear indication that "Paul" has frequently uttered the terms "Database" and "Analytics." In embodiments, the 3D word cloud representation includes a number of, or all of, the parties participating in the teleconference and displays, for example, a photograph as well as a number of terms uttered by each of the displayed parties next to the uttering party.

In embodiments, when one of the terms is selected by a third party, or by a party to the teleconference that missed a portion of the teleconference, the 3D word cloud display rearranges the display screen to display all the parties that uttered the selected term during the teleconference. In embodiments, the 3D word cloud displays the various parties that uttered the selected term along a time axis indicating a chronology of utterance of the selected term during the teleconference. Accordingly, the third party, or party that missed a portion of the teleconference, can visually identify which parties to the teleconference have uttered the selected term, and when the parties to the teleconference have uttered the selected term.

In embodiments, one of terms uttered during the teleconference can be removed by the third party, or party that missed a portion of the teleconference. In embodiments, if the third party selects one of the uttered terms and selects a "removal" option, then the 3D word cloud removes the selected term and rearranges the display so that the selected term is no longer visible. In embodiments, the 3D word cloud, in removing the selected term, also removes one of the parties if that party only uttered that term or at least if that party did not utter any other terms that are still displayed.

In embodiments, one of parties to the teleconference can be removed by the third party, or party that missed a portion of the teleconference. In embodiments, if the third party selects one of the parties to the teleconference and selects a "removal" option, then the 3D word cloud removes the selected party and rearranges the display so that the selected party is no longer visible. In embodiments, the 3D word cloud, in removing the selected party, also removes the terms uttered by the selected party. In embodiments, if the terms are uttered by another party, then the terms remain in the 3D word cloud.

Implementations of embodiments the invention provide a technical solution to the technical problem of a user missing portions of a teleconference. Embodiments of the invention improve the technology of audio/video recording review by providing users with a selectable 3D visual representation of the recording to a user. Embodiments of the invention employ an unconventional arrangement of steps including: recording a plurality of terms uttered during a communication between a plurality of parties; obtaining identifying information for one or more of the plurality of parties and terms uttered by each of the one or more parties; displaying one or more of the recorded terms along a time axis, the one or more recorded terms uttered by each party being displayed adjacent to the party, and the displayed recorded terms being selectable; and in response to one of the selectable terms being selected, displaying on the display screen, by the computer device, the one or more parties that uttered the selected term along the time axis. The steps themselves are unconventional, and the combination of the steps is also unconventional. For example, the steps of displaying one or more parties that uttered the selected term along the time axis in response to one of the selectable terms being selected creates new information that does not exist in the system, and this new information is then used in subsequent steps in an unconventional manner, namely to recall relevant portions of a recorded multiparty communication such as a teleconference. Embodiments of the invention also utilize elements and/or techniques that are necessarily rooted in computer technology, including displaying one or more selectable terms on a display screen along a time axis, and replaying the communication from a time that is correlated to the utterance time of the selected term. Embodiments improve the functioning of a computer combination, in this case a server and a client device, and more specifically includes aspects that are directed to a specific improvement of the operation of an interactive teleconference system, and thus are directed to a specific implementation of a solution to a problem in recalling targeted contents of a recorded multiparty communication such as a teleconference during or after the conclusion of a teleconference.

Embodiments of the invention relate to a method of efficiently reproducing a video recording file containing audio, including converting the audio contained in the video recording file into text, calculating an appearance frequency of each of a plurality of words contained in the text on a speaker-by-speaker basis, displaying, as a word cloud, words having high appearance frequencies among the plurality of words. In embodiments, speaker information is displayed in a region provided for each speaker, and the words of the speaker is displayed in the region. The method also includes reconfiguring the word cloud in response to an action by a user to remove a specific word or speaker information (e.g., a name or a photograph), reproducing the video recording file from an appearance point of the word in response to the user selecting the word, and moving a time zone of the word cloud from a current display to a future or a past in response to the user action on the word cloud by rotating or scrolling.

Embodiments of the method also include gradually displaying a word having a lower appearance frequency in response to the user's zoom-in operation, and gradually displaying a word having a higher appearance frequency in response to the user's zoom-out operation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
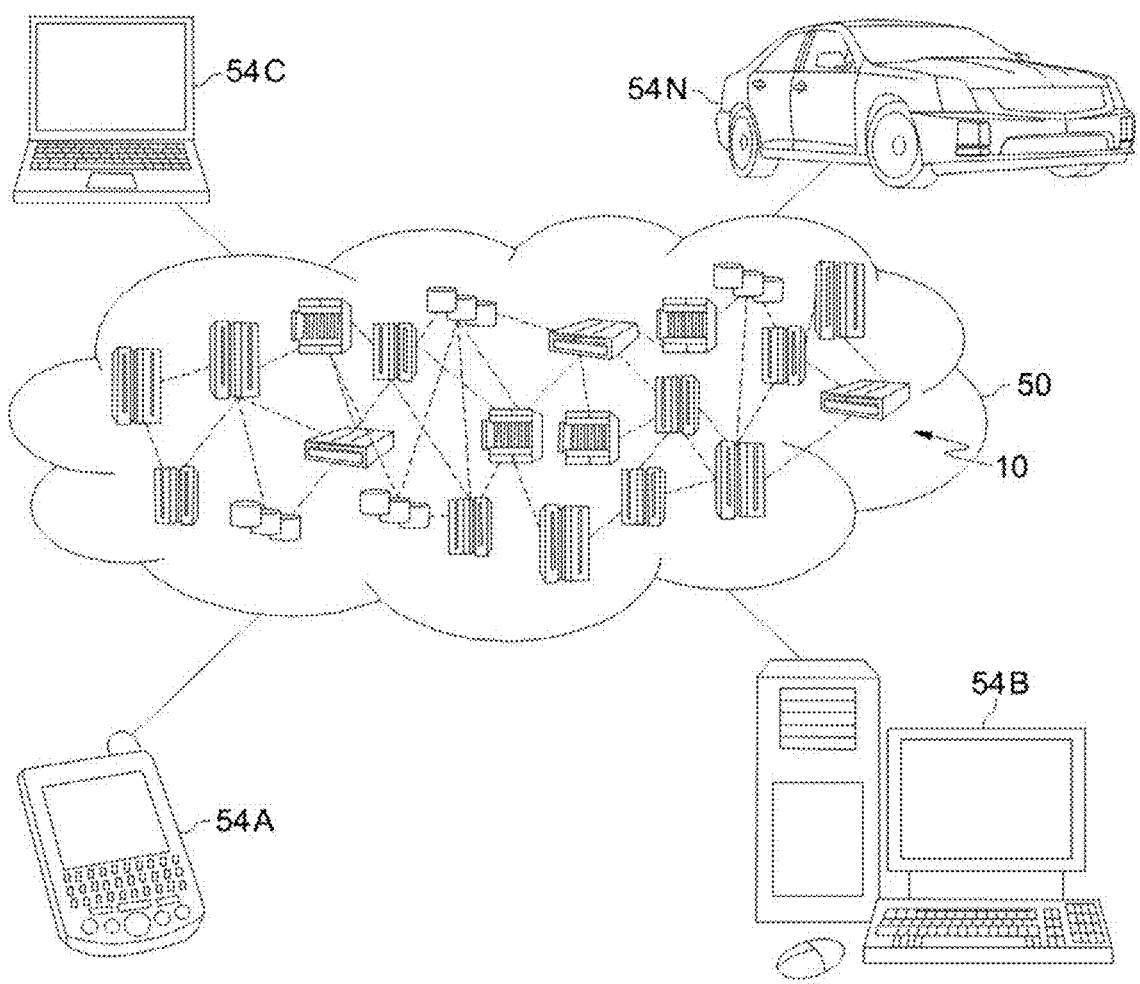
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
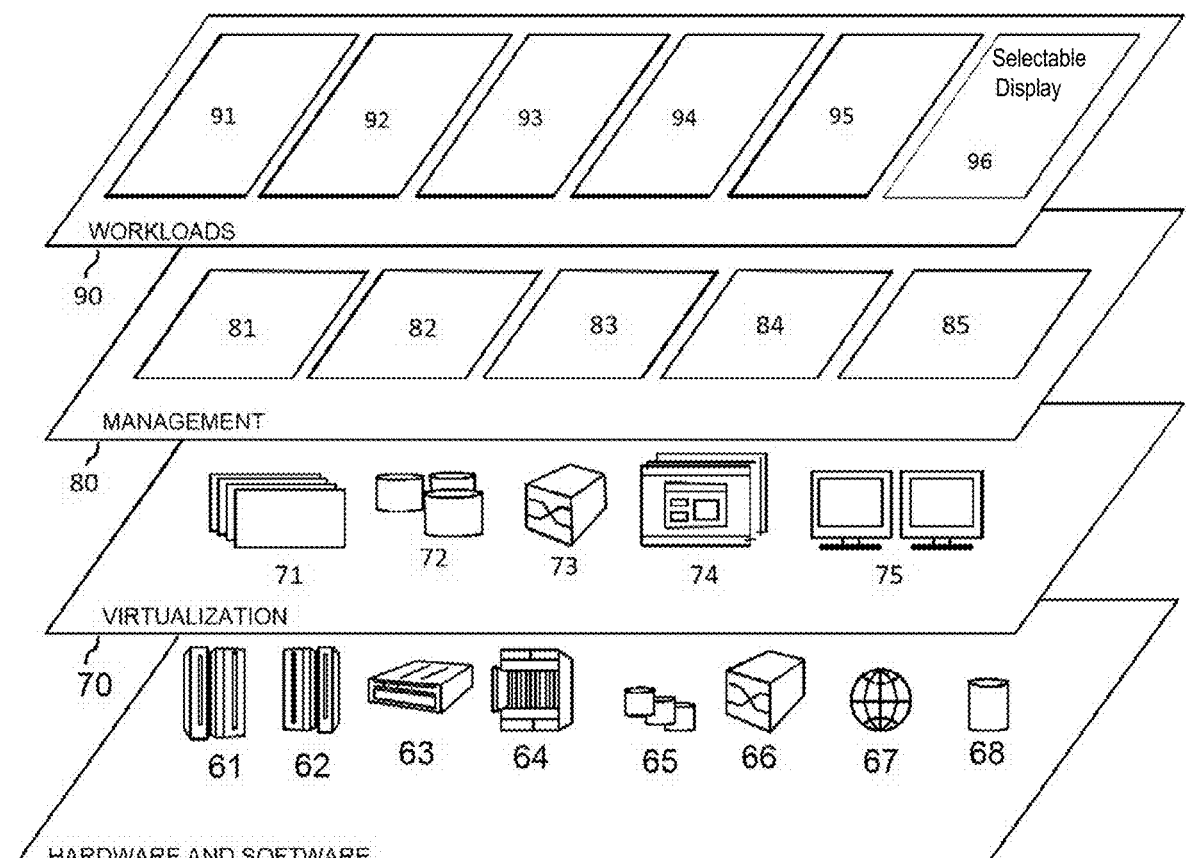
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selectable display 96.

Implementations of embodiments of the invention may include a computer system/server 12 of FIG. 1 in which one or more of the program modules 42 are configured to perform (or cause the computer system/server 12 to perform) one or more functions of the selectable display 96 of FIG. 3. For example, the one or more of the program modules 42 may be configured to: record a plurality of terms uttered during a communication between a plurality of parties; obtain identifying information for one or more of the plurality of parties and terms uttered by each of the one or more parties; display on a display screen one or more of the recorded terms along a time axis, the one or more recorded terms uttered by each party being displayed adjacent to the party, and the displayed recorded terms being selectable; and in response to one of the selectable terms being selected, display on the display screen the one or more parties that uttered the selected term along the time axis.

Figure 4A:
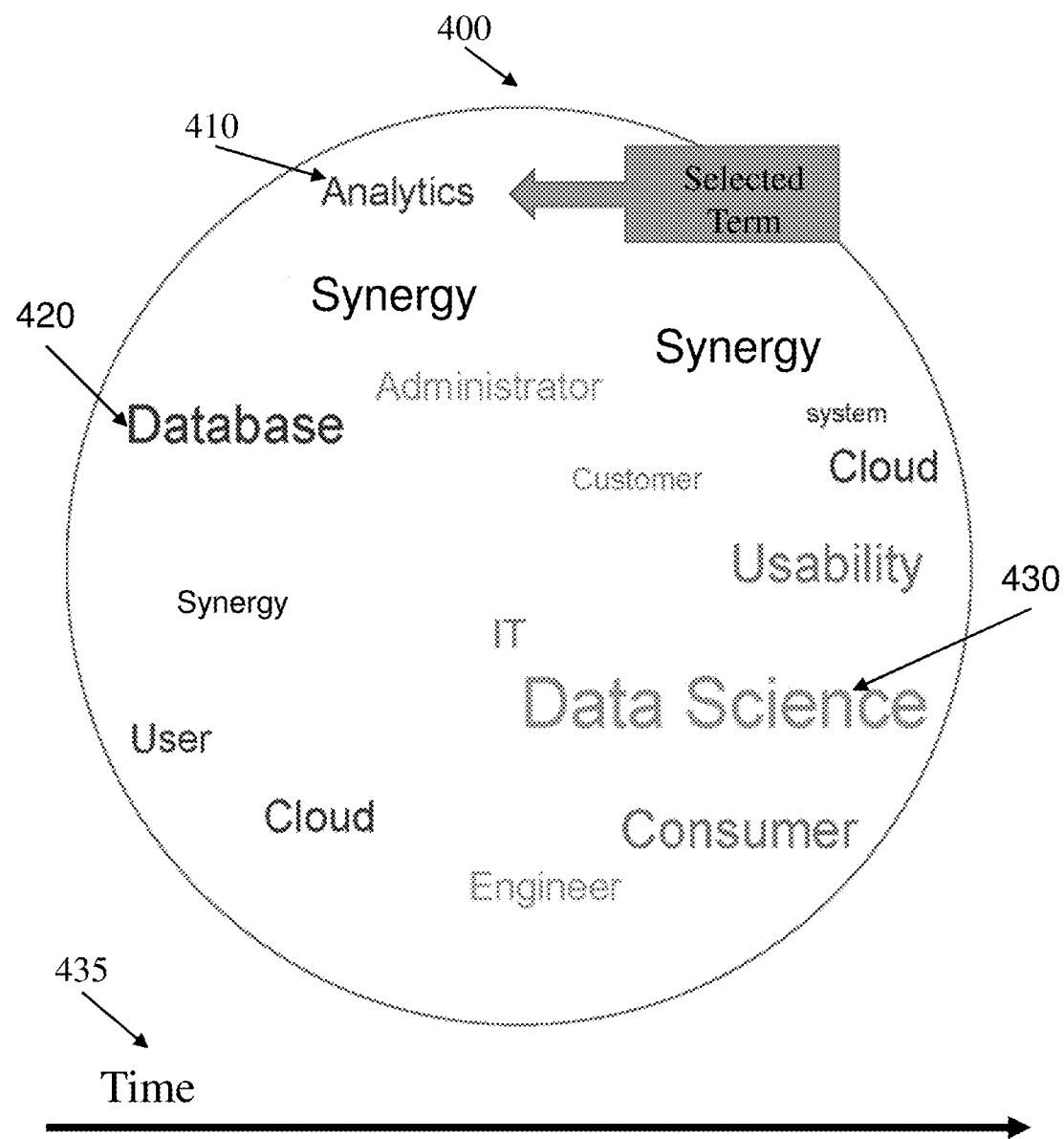
FIGS. 4A-4B show interactive display screens of an exemplary environment in accordance with aspects of the invention.
Figure 4B:
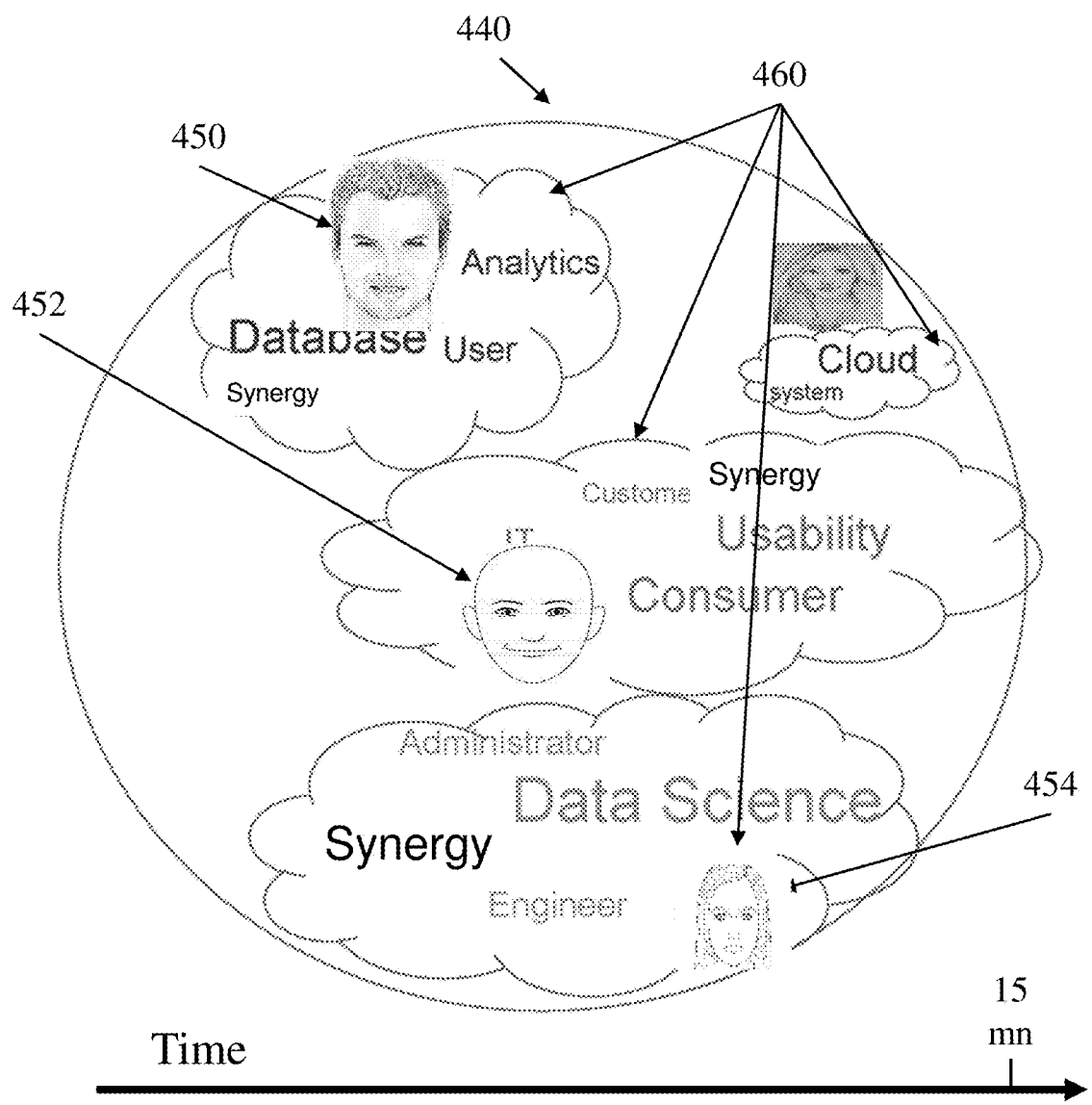

FIGS. 4A-4B show interactive display screens of an exemplary environment in accordance with aspects of the invention. In embodiments, the system records the terms uttered during a recording of a multiparty communication. In FIG. 4A, in embodiments, the 3D word cloud display 400 displays a number of terms that have been recorded during a communication between a plurality of parties such as, for example, a teleconference. In embodiments, the recording is an audio recording or a video recording. In embodiments, the communication is recorded by being transcribed into text. In FIG. 4A, the terms that have been recorded, or transcribed, during the recording between the parties are displayed on a 3D sphere-shaped platform, and are arranged on a "Time" axis 435, such that an earlier recorded term is displayed earlier on the "Time" axis 435 than a later recorded term. For example, the term "Database" 420 has been recorded, or uttered, earlier than the term "Data Science" 430 during the multiparty communication or teleconference. In embodiments, if the same term or expression is uttered a plurality of times by the same person or speaker, the 3D sphere-shaped platform displays each representative utterance time of that term or expression at different location along the time axis (e.g., with a different representative time, such as 00:30 or 00:05, for each utterance). Alternatively, the 3D sphere-shaped platform displays the term at a single representative utterance time along the time axis for a given person or speaker (e.g., corresponding to the time of the first instance that the given speaker utters that term). In embodiments, each representative utterance is displayed as a selectable reference time along the time access.

In embodiments, the size of the displayed terms is representative of the number of times, or of the frequency, at which the terms are recorded, or uttered, during the teleconference, by each speaker. In embodiments, the same term may be displayed a number of times because several speakers have uttered that same term. Accordingly, each instance of the term has a different color, associating it with a different speaker, and a different size and location on the "Time" axis, representative of the frequency at which the term is uttered by each speaker and the time at which the term is uttered by each speaker. For example, in FIG. 4A, the three displays of "Synergy" in the platform may each be in a different color to represent a different speaker and in a different size to represent a different frequency by a given speaker (e.g., the first "Synergy" is smaller because that speaker uttered it less overall but first in the communication). Further, in the same example illustrated in FIG. 4A, the term "Data Science" 430 has been uttered more times than the term "Database" 420 because the displayed size of the term "Data Science" 430 is greater than the displayed size of the term "Database" 420. In embodiments, a term that is not recorded or uttered sufficiently enough, and that has a frequency of recording that is not high enough, is not displayed on the 3D word cloud display 400. Specifically, if the frequency of a term being recorded or uttered during the communication is below a desired threshold, then in embodiments, the term is not displayed. For example, in embodiments, the threshold is one utterance of the term during a period of time of 15 minutes. In embodiments, terms that are known to not be germane to the communication, such as greeting terms such as "hello," "good morning," "how is everybody," and the like, are not included in the 3D word cloud display 400. In embodiments, the terms are selectable, and in the example illustrated in FIG. 4A, the term "Analytics" 410 is selected. In embodiments, the display screen is zoomable to increase or decrease the display size of the displayed terms 410, 420 and 430.

In embodiments, as a result of the selection of the term "Analytics" 410, as illustrated in FIG. 4B, the 3D word cloud display 440 rearranges the display of all the parties 450, 452 and 454 who uttered the selected term during the teleconference. The 3D word cloud display 440 also includes, around each of the displayed parties 450, 452 and 454, the terms that have been recorded or uttered by each of the parties 450, 452 and 454 during the teleconference, the terms uttered by each of the party being displayed within a region 460 around each party. In embodiments, the 3D word cloud display 440 includes the terms uttered by each party as associated with that party by displaying the terms in a position adjacent to the party, having the same color as the party, overlying the party's photograph, and the like. Accordingly, by selecting the term "Analytics" 410 illustrated in FIG. 4A, the 3D word cloud display 440 rearranges the display in FIG. 4B to present the different parties that have uttered the selected term within a segment of time. In embodiments, the displayed parties 450, 452 and 454 have uttered the term "Analytics" during a period of 15 min. In embodiments, the segments of time are one of 5 min, 10 min, 15 min and 30 min. In embodiments, the parties 450, 452 and 454 that are displayed on the 3D word cloud display 440 as a result of the selection of the term "Analytics" 410 are displayed even if they have not uttered the term "Analytics" 410, but have spoken within a given time frame after one of the parties has first uttered the term "Analytics" 410. For example, in embodiments, if the party 450 has uttered the term "Analytics" 410 and the parties 452 and 454 have responded to that utterance without themselves uttering the term "Analytics" 410, then the parties 452 and 454 are included in the 3D word cloud display 440 because their response is considered to be germane to the initial utterance of the term "Analytics" 410 if their response is within the given timeframe. In embodiments, the given timeframe is one of 1 min, 2 min, 5 min and 10 min.

Figure 5:
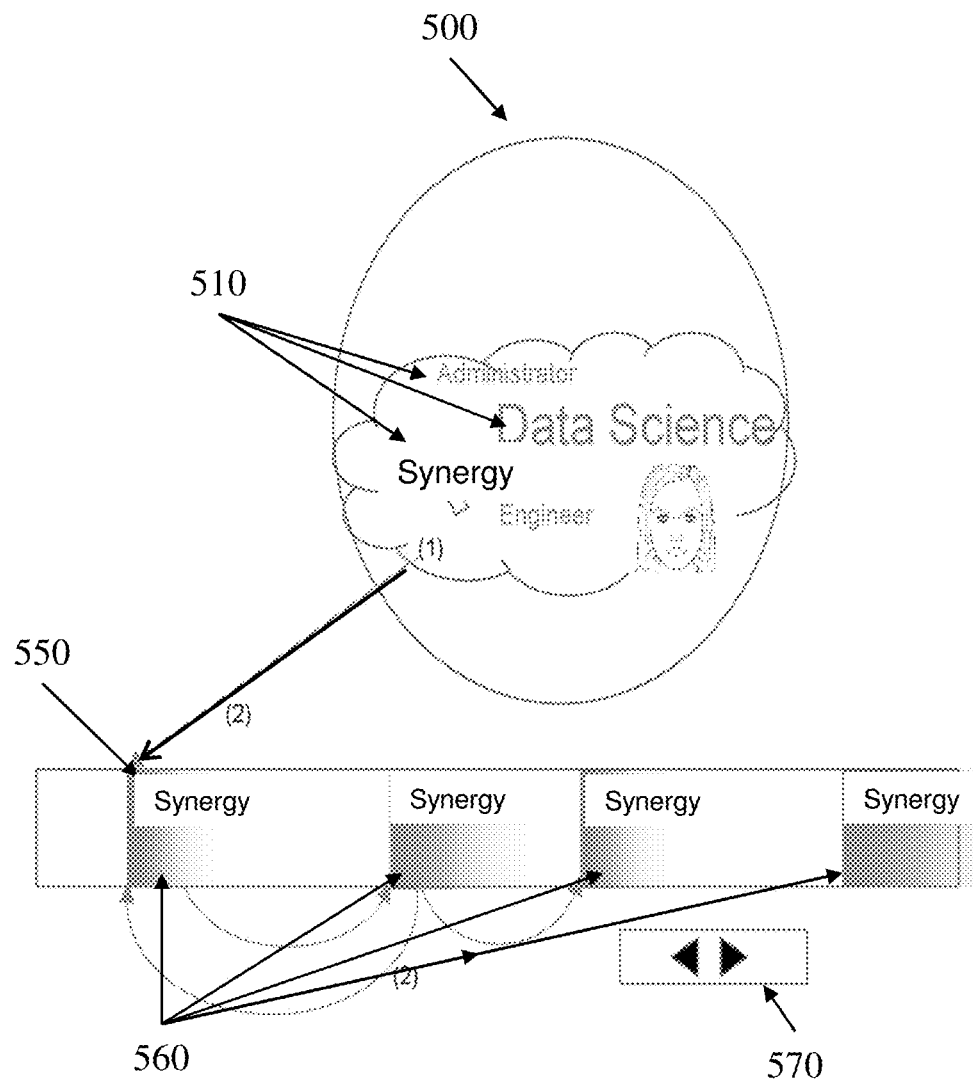
FIG. 5 shows an interactive display screen of an exemplary environment in accordance with aspects of the invention.

FIG. 5 shows an interactive display screen of an exemplary environment in accordance with aspects of the invention. In FIG. 5, the 3D word cloud display 500 includes one of the parties to the teleconference surrounded by terms 510 that the party uttered during the teleconference. In embodiments, another display 550 provides an illustration of the number of times that the party uttered a given term. In the example illustrated in FIG. 5, the display 550 provides an illustration of the number of times that the term "Synergy" has been uttered by the party during the teleconference. In this example, the term "Synergy" is displayed as associated with four different representative times (one for each of the four instances 560 that the selected party uttered the term during the communication). Specially, the term is displayed as associated with these times by displaying the term adjacent to the tick mark on each such time. Other ways of depicting a term as associated with a representative time are contemplated (e.g., linking a term with an arrow to each representative time along a timeline). In embodiments, the display 550 includes a toggle 570 which, in response to being selected, toggles or skips from one instance 560 where the term "Synergy" has been uttered to another instance 560, forward or backward. Accordingly, in embodiments, the toggle 570 allows to skip from one instance 560 to another instance 560 and back, at will, in order to review the teleconference at portions where the party uttered the given term, in this example, the term "Synergy." In embodiments, reviewing the teleconference at a portion thereof includes hearing or viewing the teleconference from a point in time corresponding to the selected instance 560 where the given term, in this example "Synergy," is uttered by the party. In embodiments, reviewing the multiparty communication at a portion thereof includes hearing or viewing the communication from a period of time prior to the point in time corresponding to the selected instance 560 where the given term is uttered by the party. For example, the teleconference may be reviewed from a point in time that is 1 min, 30 s, or 10 s prior to the point in time corresponding to the selected instance 560 where the given term is uttered by the party. In embodiments, the teleconference may also be reviewed from a point in time that is 1 min, 30 s, or 10 s later than the point in time corresponding to the selected instance 560 where the given term is uttered by the party. This can help to provide added context to the usage of the selected instance 560.

Figure 6:
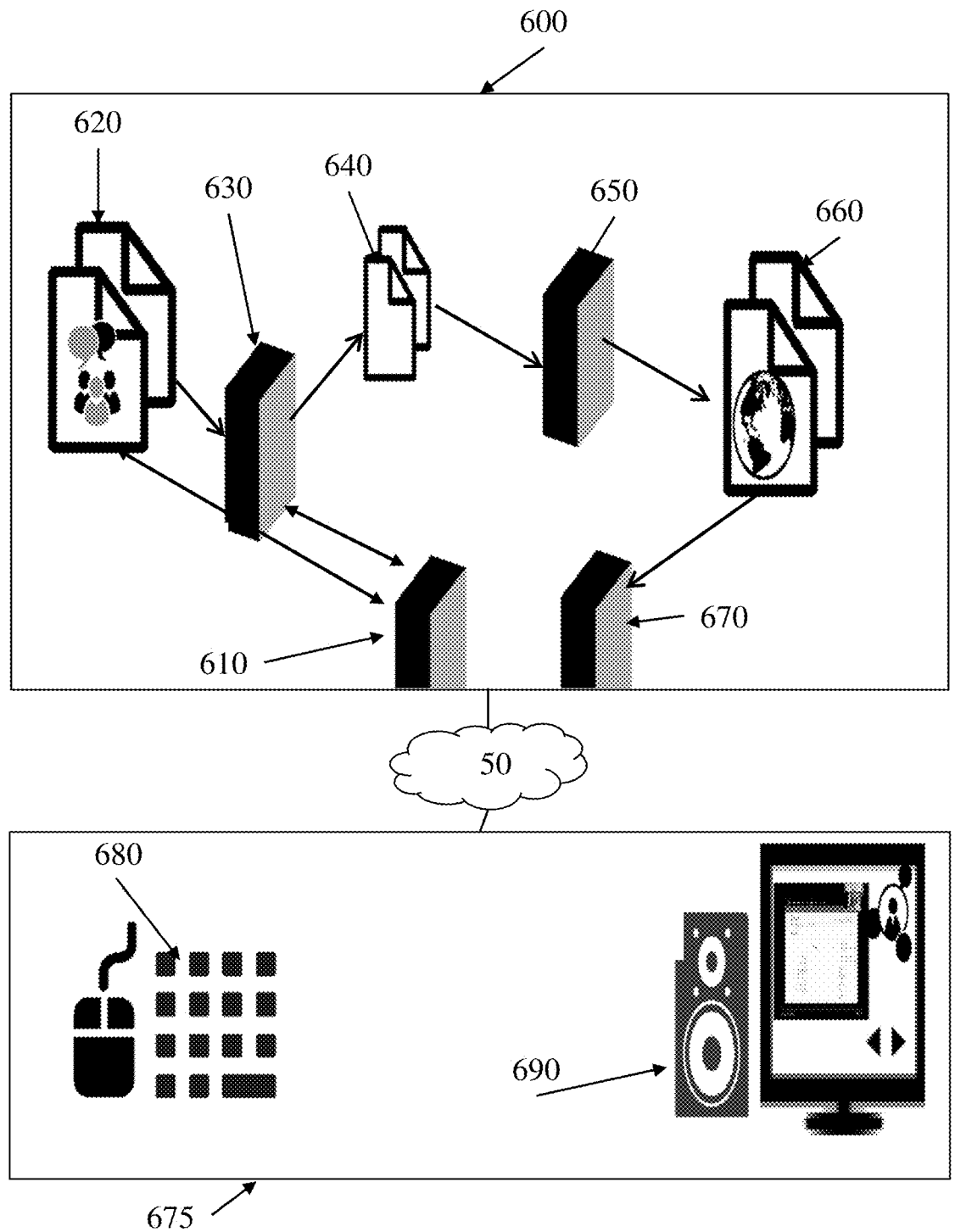
FIG. 6 shows a block diagram of an exemplary environment in accordance with aspects of the invention.

FIG. 6 shows a block diagram of an exemplary environment in accordance with aspects of the invention. In embodiments, the system 600 includes a recording and reproducing module 610 that generates an audio/video recording file 620 by recording, for example, a multiparty communication such as a teleconference, or a single party communication. In embodiments, an analysis module 630 receives the audio/video recording file 620 and analyzes the audio/video recording file 620. In embodiments, the analysis module 630 parses the contents of the audio/video recording file 620 by producing searchable data associated with each party to the teleconference, and generates word data file 640. In embodiments, the analysis module 630 parses the contents of the audio/video recording file 620 by transcribing the contents of the teleconference to searchable text. In embodiments, the analysis module 630 assigns uttered words to each party to the teleconference, as well as a time at which each word was uttered by the uttering party, and stores this information in the form of a word data file 640. In embodiments, the analysis module 630 ranks the terms uttered by the parties based on the frequency of their utterance during the teleconference, and obtains identifying information for each of the parties to the teleconference. In embodiments, if a term is frequently uttered during the communication, then the analysis module 630 gives that term a high ranking. In embodiments, the analysis module 630 considers other factors than their frequency of utterance. For example, if the term is a common term (e.g., "hello," "the," "thank you" and the like), then the analysis module 630 gives no ranking to the term. Accordingly, the analysis module 630 displays meaningful terms instead of common terms by, for example, comparing each uttered term to a table of terms established as common or as not being germane to the discussed subject matter. In embodiments, the identifying information for each of the parties to the teleconference is a photograph, a screen shot, a voice tone, and the like. In embodiments, each of the modules 610 and 630 includes one or more program modules such as program modules 42 described with respect to FIG. 1. In embodiments, each of the audio/video recording file 620, the word data file 640 and the 3D word cloud data file 660 includes one or more storage systems such as the storage system 34 described with respect to FIG. 1.

In embodiments, a 3D word cloud creating module 650 receives the word data file 640 and creates a 3D word cloud data file 660. In embodiments, the 3D word cloud data file 660 assigns the terms uttered during the teleconference to the identifying information such as a photograph, a screen shot, a voice tone, and the like, of each party that uttered the terms. In embodiments, the 3D word cloud data file 660 defines the size of each of the displayed terms based on the ranking of the term performed by the analysis module 630. In embodiments, the system 600 is operatively coupled to a client device 675 via a network. In a cloud computing implementation, the network comprises a cloud computing environment 50 as described with respect to FIG. 2, and the system 600 comprises one or more nodes 10 and the client device 675 comprises a client device 54A in the cloud computing environment.

In embodiments, a 3D word cloud display module 670 at the system 600 generates the display of the identifying information of each party to be displayed next to the terms uttered by the party on the display screen 690 of the client device 675. For example, the 3D word cloud display module 670 generates a sphere-like representation as illustrated in any one of FIGS. 4A, 4B, 5, 9, 10A and 10B, to be transmitted to and displayed on the display screen 690 of the client device 675, and the sphere-like representation is accessible via an input device 680 of the client device 675. In embodiments, at the client device 675, the input device 680 selects one of the terms uttered by the parties to the teleconference, and as a result, the 3D word cloud display module 670 of the system 600 rearranges the parties that uttered the selected term to be displayed on the display screen 690 of the client device 675 in chronological order of the teleconference, along a chronological time axis. In embodiments, the 3D word cloud display module 670 transmits data defining the parties that uttered the selected term to the display screen 690 via the cloud computing environment 50, that data including, for example, a photograph, a name, or other identifying characteristic. In embodiments, if the same term or expression is uttered a plurality of times by the same person or speaker, the 3D word cloud display module 670 displays each utterance time of that term or expression as its own representative utterance time on the display screen 690 of the client device 675. Alternatively, the 3D word cloud display module 670 displays the term a single representative instance for a given person or speaker on the display screen 690 of the client device 675. In embodiments, the input device 680 of the client device 675 selects one of the parties to the teleconference, and as a result the 3D word cloud display module 670 of the system 600 rearranges the terms uttered by that party to be displayed on the display screen 690 in chronological order of the teleconference. In embodiments, the input device 680 selects one of the terms or parties for removal, and the 3D word cloud display module 670 removes the selected term or party from the illustration to be displayed on the display screen 690 of the client device 675, and to cause to display the remaining parties and remaining uttered terms in chronological order on the display screen 690 of the client device 675. In embodiments, each of the modules 650 and 670 includes one or more program modules such as program modules 42 described with respect to FIG. 1. In embodiments, each of the input device 680, the display screen 690 and the client device 675 includes one or more components of the computer system/server 12 illustrated in FIG. 1.

Figure 7:
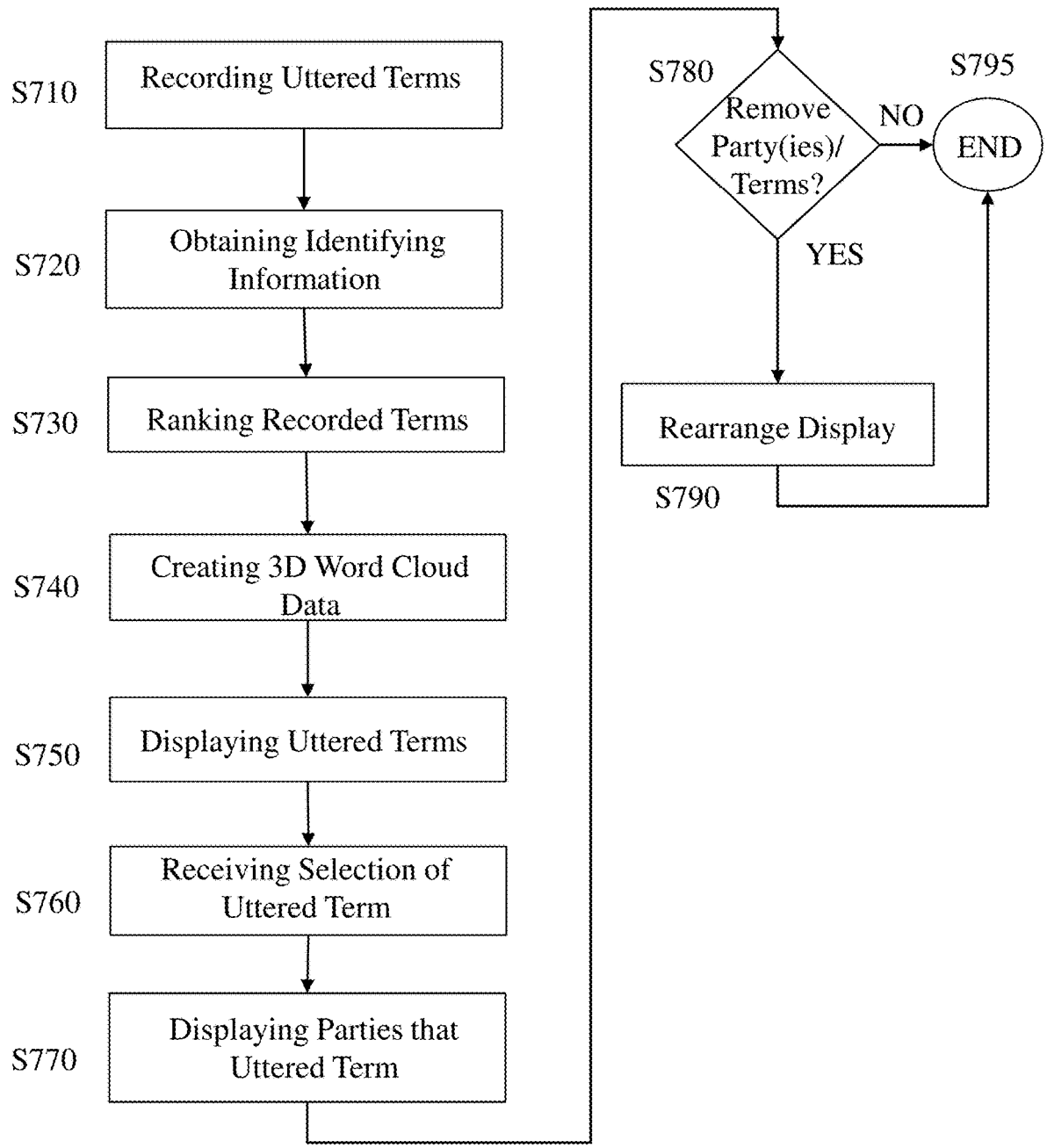
FIG. 7 shows a flowchart of an exemplary method in accordance with aspects of the invention.

FIG. 7 shows a flowchart of an exemplary method in accordance with aspects of the invention. Steps of the method may be carried out in the environment of FIGS. 4A, 4B and 6 and are described with reference to system elements depicted in FIGS. 4A, 4B and 6. At step S710, the system 600 records terms or words that are uttered during a communication between several parties such as, for example, a teleconference. In embodiments, the recording and reproducing module 610 records the teleconference. At step S720, in embodiments, the analysis module 630 parses the terms that are uttered during the teleconference. In embodiments, the analysis module 630 obtains identifying information for each of the parties such as, for example, a photograph, a screen shot, a voice tone, and the like, uniquely identifying each of the parties, and assigns the uttered terms to each party, as well as a representative utterance time at which each term was uttered by the uttering party. In embodiments, at step S730, the analysis module 630 ranks the terms uttered by the parties based on the frequency of their utterance during the teleconference. In embodiments, at step S740, the 3D word cloud creating module 650 creates the 3D word cloud data file 660. In embodiments, the 3D word cloud creating module 650 creates a correspondence between the terms uttered between the parties and each party that uttered those terms. In embodiments, the 3D word cloud creating module 650 assigns different sizes to the uttered terms based on their ranking, and assigns different colors to each uttered term identifying each party that uttered that term.

In embodiments, at step S750, the display screen 690 displays the 3D word cloud created by the 3D word cloud creating module 650, where the terms uttered by each party are arranged around the uttering party, and each term has a size that is proportional to the ranking of the term, and a color that identifies the party that uttered that term. In embodiments, at step S760, the system 600 receives a selection of one of the terms. For example, the system 600 receives the selection at the display screen 690 via the input device 680. In embodiments, the display screen 690 is a touch screen, and the system 600 receives the selection via the display screen 690. At step S770, the display screen 690 displays the selected term and the parties that either uttered the selected term or that responded to a party that uttered the selected term. In embodiments, a party that responds to the party that uttered the selected term has spoken, during the teleconference, within a given timeframe after the party that uttered the selected term. For example, the given timeframe is one of 1 min, 2 min, 5 min and 10 min.

In embodiments, at step S780, the system 600 checks whether there is a selection to remove one or more of the parties or one or more of the displayed terms from the display. In embodiments, if at step S780 the system does not receive a selection to remove one or more of the parties or one or more of the displayed terms, then at step S795 the method ends. In embodiments, if at step S780 the system receives a selection to remove one or more of the parties or one or more of the displayed terms, then at step S790 the recording and reproducing module 610 rearranges the display screen 690 to display the remaining parties or terms without the selected party or term. In embodiments, if the 3D word cloud display module 670 displays the term on the display screen 690 of the client device 675 a single representative instance for all the speakers, and, when one of the speakers is removed as discussed above with step S780, then the 3D word cloud display module 670 rearranges the relative size of the displayed term to reflect the decreased frequency of utterance of that term due the one speaker being removed. For example, a first term decreases in size while a second term comparatively increases in size because the removed speaker uttered the first term more often than the second, and removing the speaker changes the relative frequency of utterance of each of the first term and the second term.

Figure 8:
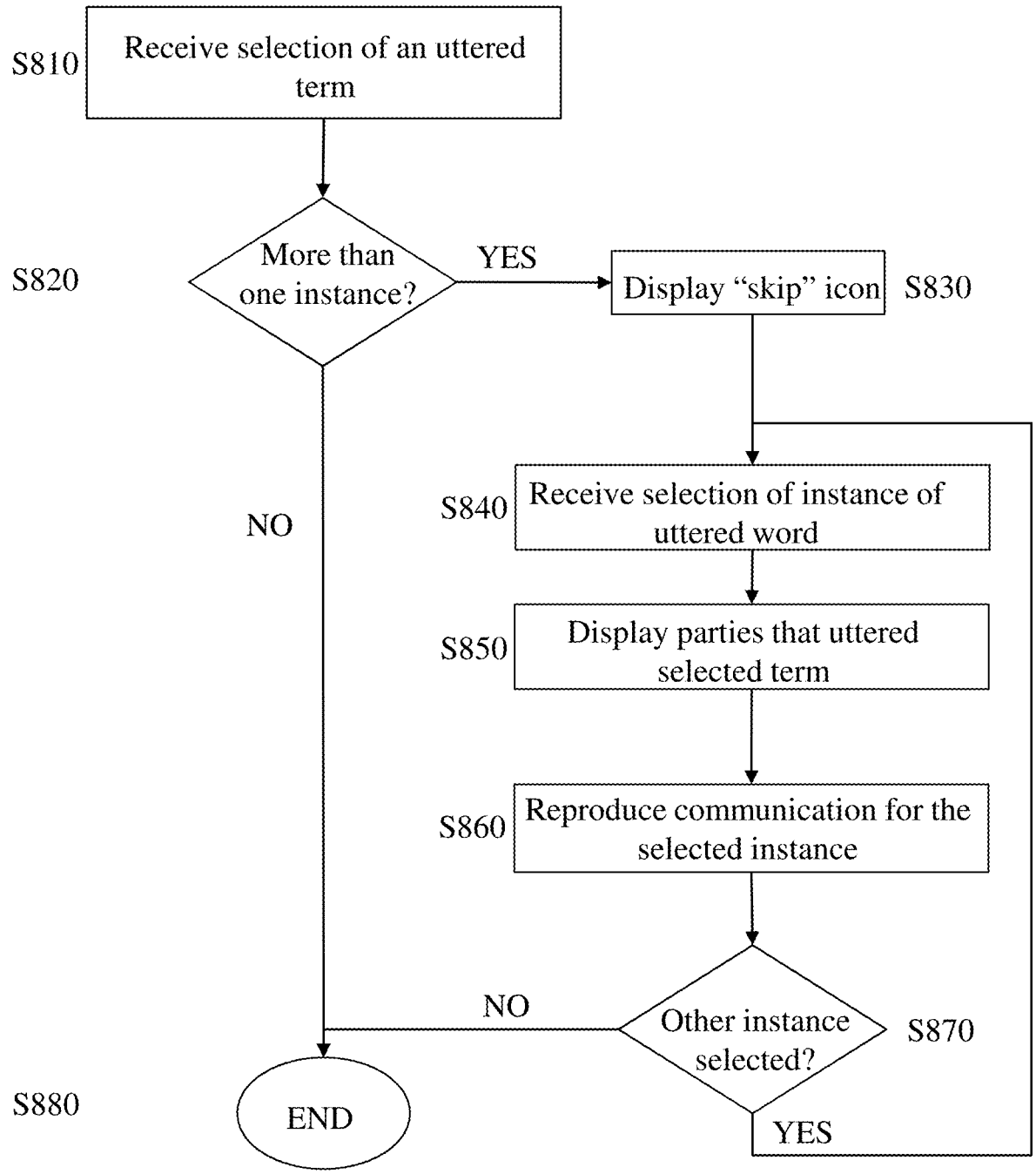
FIG. 8 shows a flowchart of an exemplary method in accordance with aspects of the invention.

FIG. 8 shows a flowchart of an exemplary method in accordance with aspects of the invention. Steps of the method may also be carried out in the environments of FIGS. 5 and 6 and are described with reference to system elements depicted in FIGS. 5 and 6. In step S810, the system 600 receives a selection of one of the terms uttered during the teleconference. For example, the system 600 receives the selection at the display screen 690 via the input device 680. In embodiments, the display screen 690 is a touch screen, and the display screen 690 receives the selection. In embodiments, at step S820 the system 600 determines whether there is a single instance of the selected term being uttered during the teleconference, or whether there are more than a single instance. In embodiments, if at step S820 the system 600 determines that there are more than one instances of the selected term being uttered during the teleconference, then at step S830, the recording and reproducing module 610 displays another icon, or "skip" icon, on the display screen, such as the toggle 570 illustrated in FIG. 5.

In embodiments, at step S840, the toggle 570 receives a selection of which instance of the selected term to replay. In embodiments, at step S850, in response to an instance of the selected term being received, the recording and reproducing module 610 displays the parties that uttered the selected term. In embodiments, at step S860, the recording and reproducing module 610 replays the communication corresponding to the selected instance of the uttered term selected at step S840. In embodiments, the system 600 checks whether another instance of the uttered term is selected at step S870. In embodiments, if at step S870, another instance of the uttered term is selected, then the method returns to step S840 and continues through steps S850, S860 and S870 as discussed above. In embodiments, if at step S870 the system 600 determines that no other instance of the uttered term is selected, then the method ends at step S880. In embodiments, if at step S820 the system 600 determines that there is a single instance of the term being uttered during the communication, then the recording and reproducing module 610 does not display a "skip" icon, and the method ends at step S880.

Figure 9:
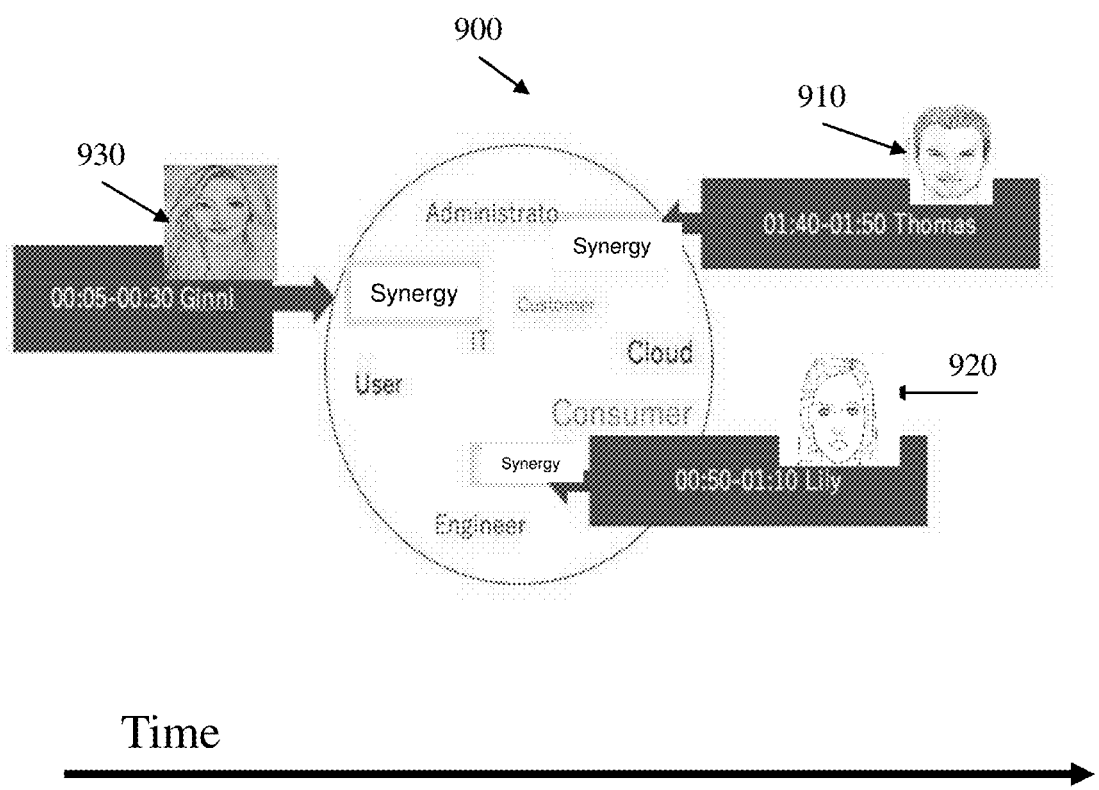
FIG. 9 shows an interactive display screen of an exemplary environment in accordance with aspects of the invention.

FIG. 9 shows an interactive display screen of an exemplary environment in accordance with aspects of the invention. Elements of the display screen illustrated in FIG. 9 may also be carried out in the environments of FIGS. 6-8 and are described with reference to elements discussed in FIGS. 6-8. In embodiments, the display 900 includes three (3) parties 910, 920 and 930 to the teleconference, and a term that has been uttered during the teleconference is selected, in this case the selected term is "Synergy." For example, the selected term "Synergy" is selected during step S760 as discussed with reference to FIG. 7. In embodiments, the recording and reproducing module 610 displays the selected term "Synergy" in varying sizes representative of the frequency of utterance of the term by each party, in different colors each representative of the party that uttered the term, and along a time axis representative of the chronological order in which the term "Synergy" was uttered. In embodiments, if the term "Synergy" is uttered a plurality of times by the same person or speaker, the 3D word cloud display module 670 displays each utterance time of the term "Synergy" on the display screen 690 of the client device 675. In other embodiments, the 3D word cloud display module 670 displays the term "Synergy" a single representative instance (and potentially at a single representative time) for a given person or speaker on the display screen 690 of the client device 675. In other embodiments, the 3D word cloud display module 670 displays the term "Synergy" a single representative instance for all the speakers, on the display screen 690 of the client device 675.

In embodiments, a first time when the term "Synergy" was uttered is at 00:05 or 5 min after the start of the teleconference, and the party who uttered the term, named "Ginni," ended that portion of the conversation at 00:30 or 30 min after the start of the teleconference. In embodiments, a second time when the term "Synergy" was uttered is at 00:50 or 50 min after the start of the teleconference, and the party who uttered the term, named "Lily," ended that portion of the conversation at 01:10 or 1 h 10 min after the start of the teleconference. In embodiments, a third time when the term "Synergy" was uttered is at 01:40 or 1 h 40 min after the start of the teleconference, and the party who uttered the term, named "Thomas," ended that portion of the conversation at 01:50 or 1 h 50 min after the start of the teleconference. In embodiments, the recording and reproducing module 610 displays, as a 3D word cloud, every instance when the term "Synergy" was uttered. In embodiments, the unique color of the displayed terms "Synergy" indicate the party that uttered the term ("Ginni," "Lily" or "Thomas), and the size of the displayed terms "Synergy" is proportional to the frequency of utterance of the term by each party.

Figure 10A:
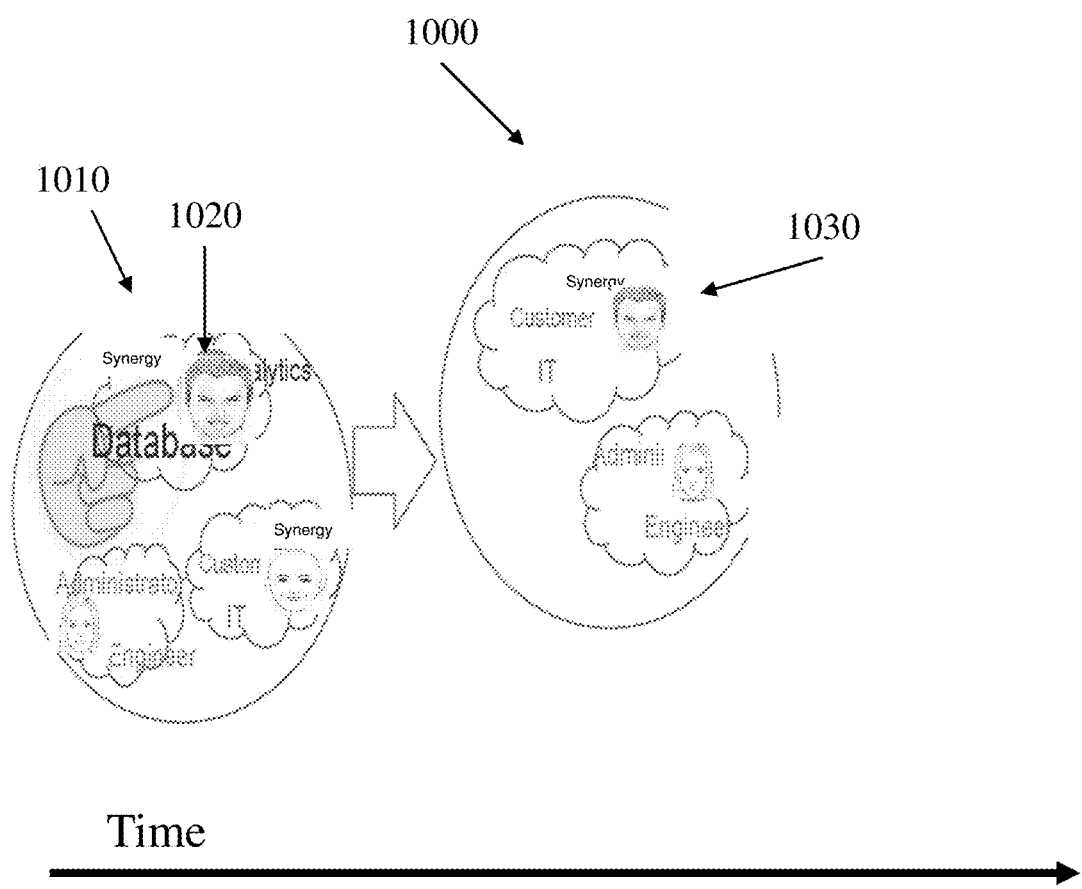
FIGS. 10A-10B show interactive display screens of an exemplary environment in accordance with aspects of the invention.
Figure 10B:
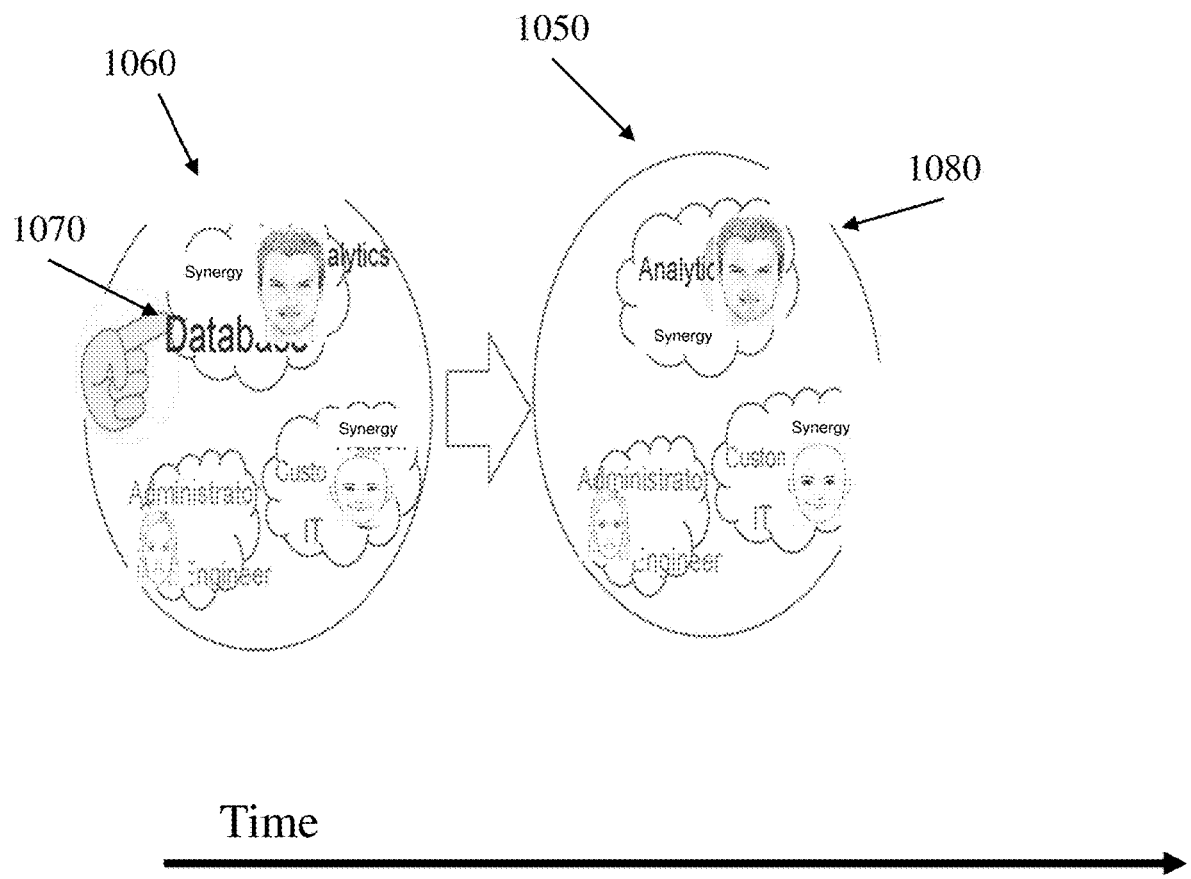

FIGS. 10A-10B show interactive display screens 1000 and 1050 of an exemplary environment in accordance with aspects of the invention. Elements of the display screen illustrated in FIG. 10A may also be carried out in the environments of FIGS. 6-8 and are described with reference to elements discussed in FIGS. 6-8. In embodiments, in FIG. 10A, the recording and reproducing module 610 displays a 3D word cloud 1010 representative of various terms uttered during the teleconference, as discussed at step S750 discussed above with respect to FIG. 7, and displays the various terms around a photograph, screen shot, or the like, of the party who uttered the terms. In embodiments, if the display screen 690 receives a selection to remove one of the parties such as, for example, the party 1020, then the recording and reproducing module 610 removes the party 1020 from the display 1000. In embodiment, the display screen 690 rearranges the display 1000 to generate a new 3D word cloud display 1030 to remove the selected party 1020 and to display the remaining parties in chronological order, as discussed above at step S770 with respect to FIG. 7.

Elements of the display screen illustrated in FIG. 10B may also be carried out in the environments of FIGS. 6-8 and are described with reference to elements discussed in FIGS. 6-8. In embodiments, in FIG. 10B, the recording and reproducing module 610 displays a 3D word cloud 1050 representative of various terms uttered during the teleconference, as discussed at step S750 discussed above with respect to FIG. 7, and displays the various terms around a photograph, screen shot, or the like, of the party who uttered the terms. In embodiments, if the system receives a selection to remove one of the terms such as, for example, the term "Database" 1070 from the displayed 3D word cloud 1050, then the recording and reproducing module 610 removes the term "Database" 1070 from the displayed 3D word cloud 1050 and rearrange the display 1050 to generate another 3D word cloud display 1080 to display the remaining terms that have been uttered in chronological order, as discussed above at step S770 with respect to FIG. 7.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   obtaining, by a computer device, a plurality of terms uttered during a recorded communication between a plurality of parties, identifying information for one or more of the plurality of parties, and an identification of which recorded terms were uttered by respective ones of the one or more parties;
   transmitting, by the computer device, data identifying one or more of the recorded terms to be displayed as associated with each respective uttering party of the one or more parties, and the recorded terms being selectable; and
   in response to one of the recorded terms being selected, transmitting, by the computer device, data identifying one or more representative utterance times that the selected term was uttered by at least one of the one or more parties, the selected term to be displayed as associated with the one or more representative utterance times along a time axis.

2. The method of claim 1, further comprising, in response to the one of the recorded terms being selected, replaying the communication from a time that is correlated to at least one of the one or more representative utterance times of the selected term.

3. The method of claim 1, further comprising ranking, by the computer device, the recorded terms based on a frequency of utterance of each term during the communication for each party of the one or more parties, wherein the term is displayed separately for each party, and wherein a display size of each separate display of each term on a display screen is correlated with the frequency of utterance of the term by the party.

4. The method of claim 3, wherein in response to the frequency of utterance of one of the uttered terms being lower than a desired frequency threshold, the uttered term is not displayed on the display screen.

5. The method of claim 1, wherein the one or more recorded terms uttered by each party of the one or more parties are displayed as associated with the party by being displayed as adjacent to each party, and wherein the selected term is displayed as associated with the one or more representative utterance times along the time axis by being displayed along a given direction on the time axis at a different relative location for each representative utterance time.

6. The method of claim 1, wherein the one or more representative utterance times comprises a plurality of representative utterance times, and wherein the plurality of representative utterance times are each displayed as a selectable time reference, the method further comprising:
   in response to one of the time references being selected, replaying the communication at a time that is correlated to the time reference.

7. The method of claim 1, wherein the method further comprises:
   transcribing the recorded utterances into text.

8. The method of claim 1, wherein the one or more representative utterance times comprises a plurality of representative utterance times, and wherein the at least one of the one or more parties comprises at least two parties.

9. The method of claim 1, wherein the displayed recorded terms are displayed in colors representative of each of the corresponding uttering parties.

10. The method of claim 1, wherein the method further comprises aggregating into a region, by the computer device, terms uttered by a first party, of the one or more parties, that uttered the selected term to be displayed, the region including only recorded terms uttered by the first party and within a predefined time period, the predetermined time period including one of the one or more representative utterance times.

11. A computer program product, the computer program product comprising a computer readable storage medium having program instructions embodied therewith, the program instructions executable by a computing device to cause the computing device to:
   obtain a plurality of terms uttered during a recorded communication between a plurality of parties, identifying information for one or more of the plurality of parties, and an identification of which recorded terms were uttered by respective ones of the one or more parties;
   transmit data identifying one or more of the recorded terms to be displayed as associated with each respective uttering party of the one or more parties, and the recorded terms being selectable; and
   in response to one of the recorded terms being selected, transmit data identifying one or more representative utterance times that the selected term was uttered by at least one of the one or more parties, the selected term to be displayed as associated with the one or more representative utterance times along a time axis.

12. The computer program product of claim 11, further comprising program instructions executable by a computing device to cause the computing device to aggregate into a region terms uttered by a first party, of the one or more parties, that uttered the selected term to be displayed, the region including only recorded terms uttered by the first party and within a predefined time period, the predetermined time period including one of the one or more representative utterance times.

13. A system, comprising:
   a processor, a computer readable memory, and a computer readable storage medium;
   program instructions to obtain a plurality of terms uttered during a recorded communication between a plurality of parties, identifying information for one or more of the plurality of parties, and an identification of which recorded terms were uttered by respective ones of the one or more parties;
   program instructions to transmit data identifying one or more of the recorded terms to be displayed as associated with each respective uttering party of the one or more parties, and the recorded terms being selectable; and
   program instructions to, in response to one of the recorded terms being selected, transmit data identifying one or more representative utterance times that the selected term was uttered by at least one of the one or more parties, the selected term to be displayed as associated with the one or more representative utterance times along a time axis, wherein the program instructions are stored on the computer readable storage medium for execution by the processor via the computer readable memory.

14. The system of claim 13, further comprising program instructions to, in response to the one of the recorded terms being selected, replaying the communication from a time that is correlated to at least one of the one or more representative utterance times of the selected term.

15. The system of claim 13, further comprising program instructions to rank the recorded terms based on a frequency of utterance of each term during the communication for each party of the one or more parties, wherein the term is displayed separately for each party, and wherein a display size of each separate display of each term on a display screen is correlated with the frequency of utterance of the term by the party.

16. The system of claim 13, further comprising program instructions to aggregate into a region terms uttered by a first party, of the one or more parties, that uttered the selected term to be displayed, the region including only recorded terms uttered by the first party and within a predefined time period, the predetermined time period including one of the one or more representative utterance times.

17. A method, comprising:
transmitting, by a computer device, one or more terms uttered by respective ones of a plurality of parties to a recorded communication to be displayed as associated with each respective uttering party of the plurality of parties;
receiving, by the computer device, a selection of one of the displayed terms;
in response to the selection, transmitting, by the computer device, one or more selectable time references to be displayed, the one or more selectable time references corresponding to instances at which the selected term was uttered during the recorded communication; and
in response to the selected time reference being selected, transmitting, by the computer device, the recorded communication to be replayed from a time that is correlated to the selected time reference.

18. The method of claim 17, further comprising transmitting, by the computer device, one or more of the parties that uttered the selected term to be displayed adjacent to the selected time reference.

19. The method of claim 18, wherein adjacent to each party, the selectable terms are along a given direction on the time axis based on an utterance time of each term for each selected time reference.

20. The method of claim 17, further comprising ranking, by the computer device, the terms based on a frequency of utterance of each term during the recorded communication, wherein a display size of each term on a display screen is correlated with the frequency of utterance of the term by the party.

21. The method of claim 17, further comprising in response to one of the selectable time references being selected, aggregating into a region, by the computer device, terms uttered by a first party, of the parties, that uttered the selected term to be displayed, the region including only recorded terms uttered by the first party and within a predefined time period, the predetermined time period including the selected time reference.

22. A system, comprising:
a processor, a computer readable memory, and a computer readable storage medium;
program instructions to transmit one or more terms uttered by respective ones of a plurality of parties to a recorded communication to be displayed as associated with each respective uttering party of the plurality of parties;
program instructions to receive a selection of one of the displayed terms;
program instructions to, in response to the selection, transmit one or more selectable time references to be displayed, the one or more selectable time references corresponding to instances at which the selected term was uttered during the recorded communication; and
program instructions to, in response to one of the selectable time references being selected, transmit the recorded communication to be replayed from a time that is correlated to the selected time reference,
wherein the program instructions are stored on the computer readable storage medium for execution by the processor via the computer readable memory.

23. The system of claim 22, further comprising program instructions to transmit one or more of the parties that uttered the selected term to be displayed adjacent to the selected time reference.

24. The system of claim 22, further comprising program instructions to rank the terms based on a frequency of utterance of each term during the communication, wherein a display size of each term adjacent to each party is correlated with the frequency of utterance of the term by the party.

25. The system of claim 22, further comprising program instructions to aggregate, in response to one of the selectable time references being selected, into a region terms uttered by a first party, of the parties, that uttered the selected term to be displayed, the region including only recorded terms uttered by the first party and within a predefined time period, the predetermined time period including the selected time reference.

* * * * *